C. KUENTZEL.
TIRE CORE STRIPPING MACHINE.
APPLICATION FILED JAN. 12, 1922.
Reissued Feb. 14, 1922.
15,284.
2 SHEETS—SHEET 1.
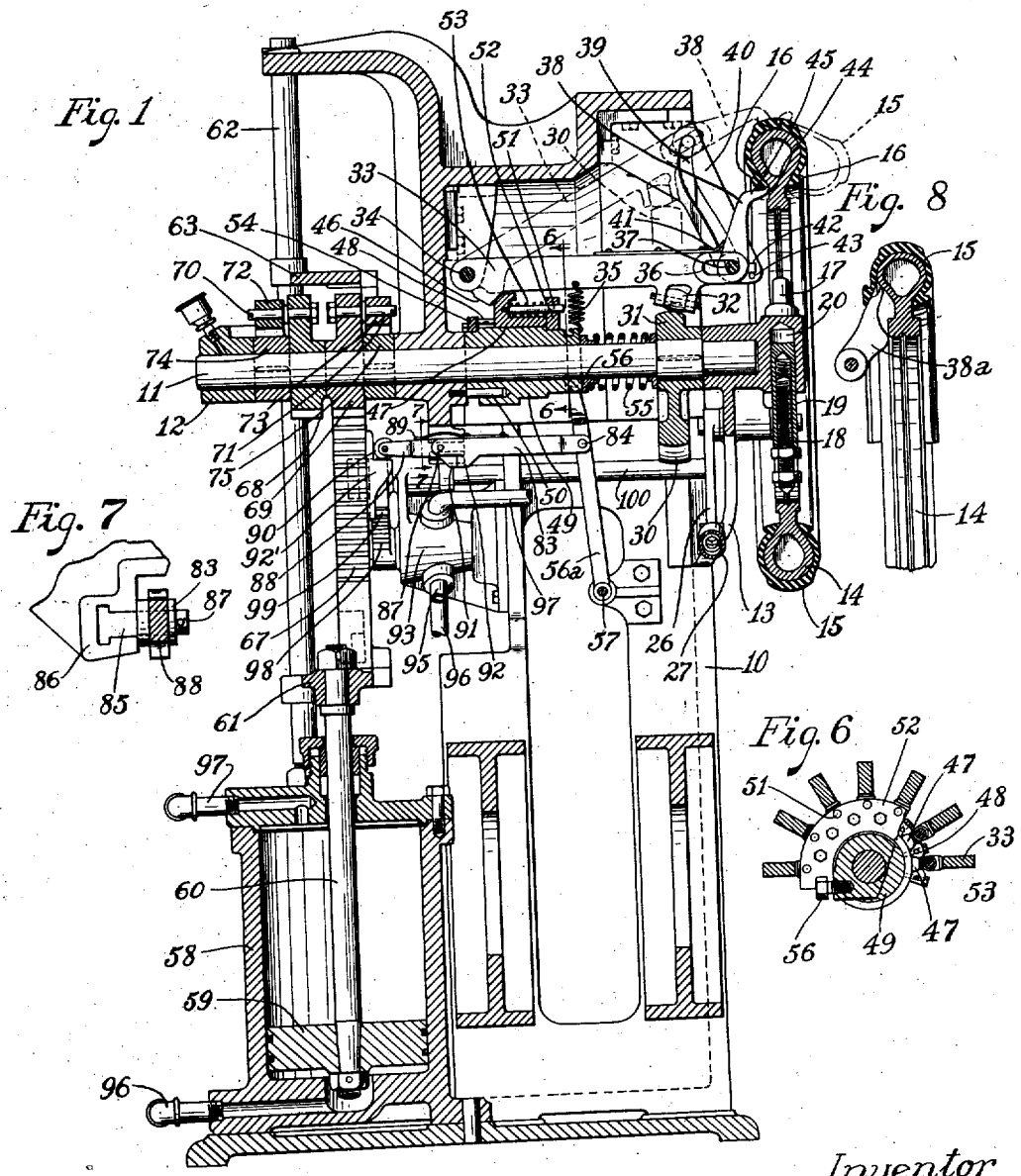
Inventor
Curt Kuentzel.
By Robert McPherson
Atty.

C. KUENTZEL.
TIRE CORE STRIPPING MACHINE.
APPLICATION FILED JAN. 12, 1922.
Reissued Feb. 14, 1922. 15,284.
2 SHEETS—SHEET 2.
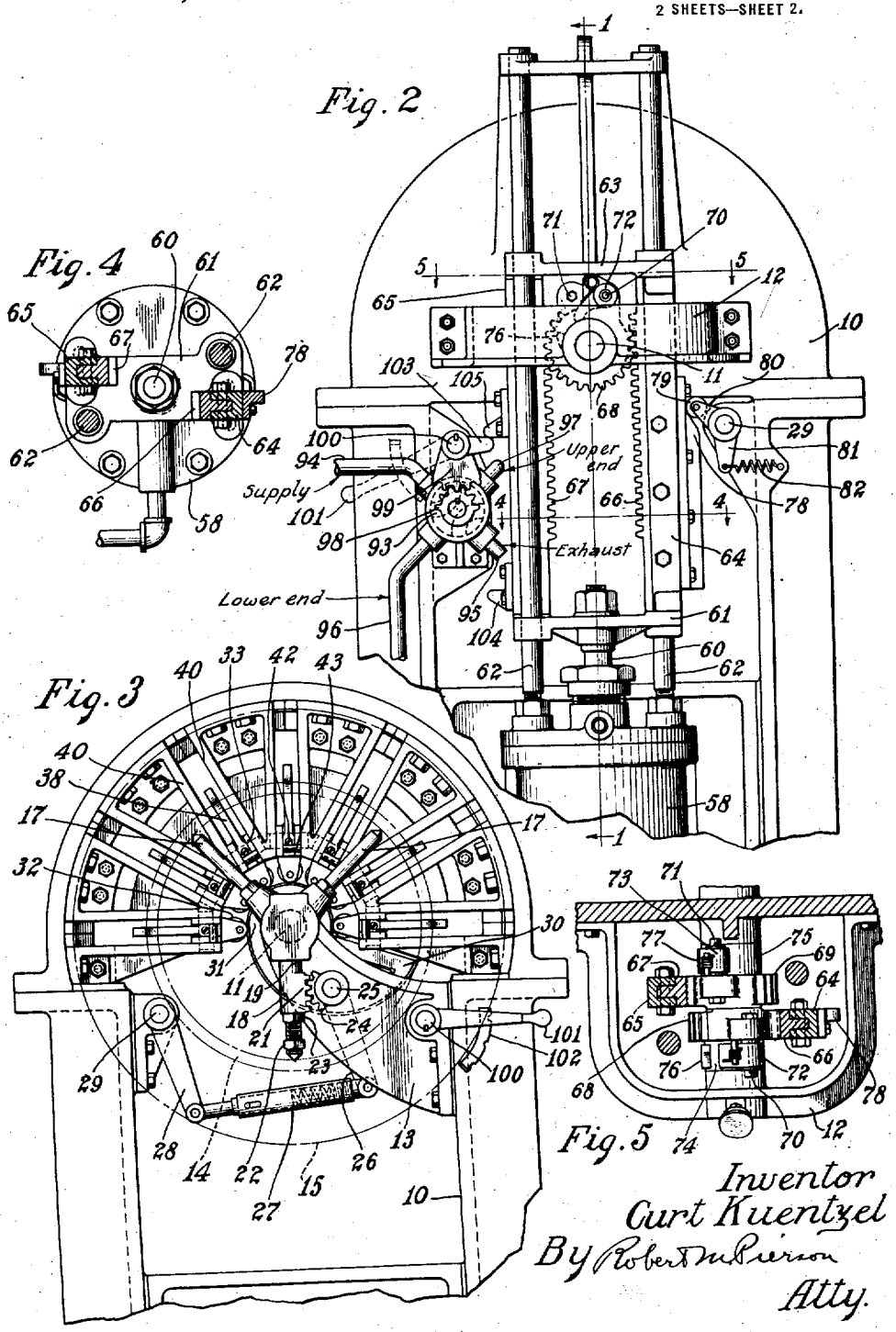
Inventor
Curt Kuentzel
By Robert M. Pierson
Atty.

UNITED STATES PATENT OFFICE.

CURT KUENTZEL, OF AKRON, OHIO, ASSIGNOR TO THE B. F. GOODRICH COMPANY, OF NEW YORK, N. Y., A CORPORATION OF NEW YORK.

TIRE-CORE-STRIPPING MACHINE.

15,284. Specification of Reissued Letters Patent. Reissued Feb. 14, 1922.

Original No. 1,395,434, dated November 1, 1921, Serial No. 376,587, filed April 26, 1920. Application for reissue filed January 12, 1922. Serial No. 528,863.

*To all whom it may concern:*

Be it known that I, CURT KUENTZEL, a citizen of the United States, residing at Akron, in the county of Summit and State of Ohio, have invented a certain new and useful Tire-Core-Stripping Machine, of which the following is a specification.

This invention relates to machines for stripping soft-bead pneumatic tire casings from the cores on which they have been vulcanized. One object is to provide an apparatus whereby the casing may be removed with a minimum of strain and abrasive action thereon, and a further object is to render the operation completely automatic through one cycle thereof when initiated by a simple controlling act, such as the movement of a starting handle to its first operating position. Incidental objects consist in the provision of novel instrumentalities and combinations in a machine of this general type as will more fully hereinafter appear.

Of the accompanying drawings,

Figure 1 is a longitudinal vertical section of a tire-stripping machine embodying my invention, showing the work in position, those of the stripping fingers and connections in the back-ground being omitted in this view for the sake of clearness.

Fig. 2 is a rear elevation, partly broken away.

Fig. 3 is a front elevation.

Figs. 4 and 5 are horizontal sections on the correspondingly-numbered lines of Fig. 2.

Figs. 6 and 7 are sections on the correspondingly-numbered lines of Fig. 1.

Fig. 8 is a cross-section of part of a core and tire showing a modified form of stripping finger.

In the drawings, 10 is a frame, and 11 is a shaft mounted to turn in bearings on brackets 12, 13 thereon. 14 is an annular tire core or mandrel of the usual "solid" type on which soft-bead clencher tire casings are formed and cured. 15 is a tire casing on the core, the core and casing being represented in full lines in Fig. 1 and in broken lines in Fig. 3. 16, 16 are the beads or edge portions of the casing.

On the front bracket 13 is located a chuck or core-holder comprising two rigidly-mounted, upwardly-projecting, divergent arms 17, 17 with pointed ends for engaging the grooved inner periphery of the core, and a third downwardly-projecting arm 18 adapted to be projected downwardly against and retracted upwardly from the lower part of said inner periphery to clamp and release the core which is supported by the two upper arms, said core being thus removably mounted and clamped on the holder, concentrically with the shaft 11 and the stripping members, and adapted to be quickly exchanged for a fresh core. The chuck-arm 18 comprises a body portion 19 radially slidable in a socket 20 in the hub of the bracket 13 and formed with a short gear rack 21, and a threaded point member 22 screwed into said body and having a check-nut 23, whereby the point may be adjusted and fixed on the body. Rack 21 meshes with a gear segment 24 on a rock-shaft 25 from which depends an arm 26 connected by a telescopic spring link 27 with an arm 28 on a second rock-shaft 29, the latter being oscillated by a sliding cam as hereinafter described, to operate the chuck-arm 18; the spring link furnishing a yielding connection which prevents breakage under the positive action of the cam.

30 is a volute cam fixed to the shaft 11 immediately in back of the bracket 13 and having a semi-circular small portion 31 concentric with said shaft. A series of rollers 32, mounted on the ends of levers 33 which are fulcrumed at 34 on the frame, bear on the periphery of this cam, and are yieldingly held against it by springs 35 attached to the levers. The forward ends of the levers are forked and formed with longitudinal slots 36 occupied by the pivot pins 37 of a series of tire-stripping fingers 38. Each pivot pin is extended at both ends to enter a pair of slots 39 formed in brackets 40 between which the finger 38 is guided radially as a whole and on which its pivot pin is guided by the slots 39 in a path which approximately parallels the side contour of the core, the slots 36 in the lever permitting the accompanying longitudinal movement of the pin on said lever. A leaf spring 41 on the lever 33 holds the extremity of the finger 38 in its starting position against the tongue of the core when the lever is depressed, and a pin 42 on the hub of the finger, engaging a stop pin 43 on one of the brackets 40, prevents the finger from falling forward if no core is present when the parts are in this position. The upper extremity of the stripping finger is formed with a short point or projection 44 to catch under the toe of the tire bead 16, and with a rest or shoulder 45 for engaging the base of said bead and pushing thereon with the avoidance of a substantial degree of insertion of the finger between the tire casing and the core.

In Fig. 1 the retracted or starting position of the lever and stripping finger is shown in full lines and their fully projected or finishing position is shown in broken lines. To hold the several levers and fingers in their projected positions when they have been moved thereto by the cam 30, I provide each lever 33 at a point near its fulcrum with a heel projection 46 against the curved forward side of which abuts a block 47 adapted to slide between suitable guide bars 48 (Figs. 1 and 6) on a sleeve 49 which is mounted to slide axially on the shaft 11 and is held from rotation by means of a fixed pin 50. The several blocks 47 are provided with pins 51 sliding in holes in a segmental plate 52 affixed to the sleeve 49 and are yieldingly projected rearwardly by springs 53 surrounding these pins. When the heel projection 46 on a lever 33 rises past the highest point on a block 47 the latter automatically slides under said heel projection and prevents the lever from returning, the rearward movement of the block being limited by a segmental stop plate 54 affixed to the rear end of the sleeve. The sleeve 49 is projected rearwardly by a spring 55 and at its forward end is provided with studs 56 engaged by the forked upper end of a lever 56ª fulcrumed on the frame at 57 for drawing the sleeve forward to restore the several blocks 47 to their positions in front of the heel projections 46.

For operating these several instrumentalities, I provide on the bed of the frame 10 at the rear of the machine an upright pneumatic cylinder 58 containing a piston 59 whose rod 60 extends upwardly to a cross-head 61, which slides vertically on a pair of guide rods 62. 63 is an upper cross-head also adapted to slide on said rods and 64, 65 are a pair of bars which connect these cross-heads and upon which are secured a pair of vertical gear racks 66, 67 lying respectively in back and in front of the transverse axial plane of the piston rod. Loosely mounted on the shaft 11 are a pair of gear segments 68, 69 meshing with the respective racks 66, 67 and having pins 70, 71 on which are pivoted pawls 72, 73 yieldingly pressed against the peripheries of a pair of collars 74, 75 which are keyed to the shaft 11. The collar 74 is formed with a single tooth or projection 76 adapted to be engaged by the pawl 72 and in the same position on the collar 75 is formed a similar tooth or projection 77 adapted to be engaged by the pawl 73, the effect of this arrangement being to rotate the shaft 11 through a half turn on the up stroke of the piston 59 by the action of the pawl 72 and through the other half turn on the down stroke of the piston by the action of the pawl 73.

For operating the movable arm 19 of the core chuck I provide on the outer side of the rack bar 64 a cam bar 78 acting on a roller 79 carried by a short arm 80 which is fixed to the rear end of the rock shaft 29, said shaft having another arm 81 connected with a spring 82 for holding said roller against the cam bar.

For actuating the sleeve 49 to retract the lever-locking blocks 47, I provide a push rod 83 (Figs. 1 and 7) whose forward end is pivoted at 84 to the lever 56ª, while its rear end is supported and guided on a T-block 85 mounted to slide horizontally in a guide 86 on the frame, and on a pin 87 on this push rod I pivot a gate latch 88 which yields against a spring 89 to an upward thrust exerted against a roller 90 at its rear end but is held by a pair of stop lugs 91, 92 on said latch and push rod respectively in rigid alinement with the push rod when a downward thrust is exerted against said roller. These upward and downward thrusts are exerted respectively by the square upper face and curved lower face of a cam 92′ which underlies the roller 90 in the lowest position of the piston 59, displaces said latch pivotally and passes its roller on the up stroke of the piston and exerts a resultant horizontal thrust against said latch and push rod on the down stroke of said piston.

Control of the air distribution is effected by a four-way valve device 93 of ordinary construction, whose casing is provided with a compressed air supply pipe 94, an exhaust branch 95 opposite thereto, a pipe 96 leading to the lower end of the air cylinder 58 and an opposite pipe 97 leading to the upper end of said cylinder. On the stem of the valve plug is mounted a gear segment 98 having an oscillation angle of 90° and meshing with another gear segment 99 on a rock shaft 100 to which is affixed a controlling handle 101 operating over a sector 102. In the middle position of this handle the valve is in its neutral position and blanks all the ports. In the upper position of the handle, compressed air is supplied from the pipe 94 through the pipe 96 to the lower end of the air cylinder, while the upper end thereof is exhausted through the pipe 97 and the outlet branch 95. In the lower position of the handle, compressed air is supplied from pipe 94 through the pipe 97 to the upper end of the air cylinder and the lower end thereof is exhausted through pipe 96 and the branch 95. On the rock shaft 100 is affixed a trip lug 103 adapted to be alternately encountered by two lugs 104, 105 on the rack bar 65 as the piston 59 near the upper end and the lower end of its stroke respectively, lug 104 serving to turn the controlling valve from a position in which it has been charging the lower end and exhausting the upper end of the cylinder to the reverse position which charges the upper end and exhausts the lower end, while the lug 105 restores the valve to its neutral position.

At the beginning of a cycle of operations the parts have the positions shown in Figs. 1 and 2. A core 14 having a vulcanized tire casing 15 thereon is placed on the rigid upper chuck arms 17 and the air valve controlling handle 101 is thrown to its upper position on the sector 102. Compressed air is thereby admitted to the lower end of the air cylinder 58 while its upper end is opened to the exhaust, the trip lug 103 being at the same time turned downwardly away from the lug 105. The initial upward movement of piston 59 causes the cam bar 78 to displace the roller 79 thereby turning the rock shaft 29 which oscillates the rock shaft 25 through arms 28 and 26 and the connecting link 27, depressing the movable chuck arm 18 against the inner periphery of the tire core so as firmly to clamp said core in place. The action of first closing the chuck without operating the stripper fingers may be allowed for either on the profile of the cam 30 or by a lost motion between the pawls 72, 73 and their lugs 76, 77. While the chuck is being closed the rollers 32 are on the small concentric portion of cam 30. Further upward movement of the piston 59 causes the cam shaft 11 to be turned through an angle of 180° by the action of the rack 66, pinion segment 68, pawl 72 and lug 76. The pawl 73 is at the same time by means of the rack 67 and pinion segment 69 turned clock-wise as viewed in Fig 2 until it drops in back of the lug 77 (now at the right of the shaft axis). As the piston nears the end of its up stroke the lug 104 encounters lug 103 and reverses the position of the air valve, thus exhausting the lower end of the cylinder 58 and admitting compressed air above the piston. The piston then descends and the pawl 73 turns the cam shaft 11 through another 180° of travel during the down stroke of the piston. As said down stroke is completed, the action of lug 105 against the lug 103 restores the control valve to its neutral port blanking position. Thus the action of the machine is made completely automatic after its initiation by turning the handle 101 to its upper position. In making one complete revolution in the manner described, the volute portion of cam 30 acting upon the rollers 32 successively moves the several levers 33 and stripper fingers 38 from their full line positions to their broken line positions indicated in Fig. 1 and the locking blocks 47 successively slipping under the heel projections 46 on said levers serve to retain the latter in their projected positions after the point of the cam has passed beyond their rollers 32. The outward radial movement of the stripper fingers 38 causes their extremities to travel along the inner side face and over on the tread or crown of the core 14 on the upper half or semi-circle of its circumference and the shape of the ends of said fingers causes them to push against the base of the inner bead 16 of the tire casing and force it over the crown of the core without substantially lifting said bead away from the core as indicated by the broken line position of the upper part of said casing in Fig. 1, while the lower part of the casing remains in position on the core. At the completion of this operation the tire is sufficiently free of the core to be pulled off the remaining distance with small effort or to drop off by gravity. In the latter part of the down stroke of the piston the curved under side of lug 92′ displaces the latch 88 and push rod 83 to the right as viewed in Fig. 1, thus moving the sleeve 49 forward on the shaft 11 and causing its plate 54 to restore the locking blocks 47 simultaneously to their positions in front of the heel projections 46, thus permitting the springs 35 to restore the levers 33 and stripper fingers 38 to their starting positions. As the piston completes its down stroke, the cam bar 78 withdraws from under the roller 79 and allows spring 82 to retract the chuck arm 18, thereby unclamping the tire core. It will be seen that not only is the action of the machine made completely automatic through one cycle of operations after movement of the controlling lever 101 to its upper position but also the construction and arrangement of the stripping tools and their operating devices is such that there is no sliding or abrasive action whatever of the tools upon the tire either circumferentially or transversely on the inner surface thereof and the bead is stretched the minimum amount necessary to let the core out of the casing, in which respects my invention improves upon the action of prior devices for stripping tires from their cores.

Fig. 8 shows a modified form of stripping finger 38ª which, when used with suitably arranged operating devices of the general nature above described, can be made to operate between the inside of the tire casing and the surface of the core for the purpose of lifting the bead at a plurality of points on one side away from and over the tread of the core, but this modified construction and mode of operation is considered less desirable than what has been previously described, because of the fact that the bead is more stretched, the finger has to move a greater distance over the tread of the core in order to get the tire off and the transverse sliding contact between the finger and the inner surface of the tire is more apt to produce an injury to the latter than where the bead is merely pushed over as indicated in Fig. 1.

I claim:

1. In a machine for stripping tire casings from cores, the combination of core-supporting means, and a semi-circular series of tire stripping members having a substantially fixed relation to the core circumferentially thereof and adapted to act radially thereof to force an edge of the tire casing over the core on one part of the tire circumference while the opposite part remains substantially fixed on the core until the first-said part is clear.

2. In a machine for stripping tire casings from cores, the combination of core-supporting means, a series of core-stripping fingers adapted to act radially outward on the side and laterally over the tread portion of the core and grouped in a circumferentially-fixed relation to said core over substantially half only of its circumference, and an operating means common to said group of fingers.

3. In a machine for stripping tire casings from cores, the combination of a core holder, a tire core removably supported thereon, a group of radially-acting tire-stripping fingers mounted in circumferentially-fixed relation thereto, and means for successively projecting said fingers and so holding them in order progressively to force an edge of the tire casing over the core.

4. In a machine for stripping tire casings from cores, the combination of a fixed core holder, a group of circumferentialy-fixed tire-stripping members distributed over substantially half of the core circumference, and operating means common to said members adapted successively to project them and hold them projected.

5. In a machine for stripping tire casings from cores, the combination of a core holder, and means acting on the bead only of the tire casing, over substantially one-half part only of its circumference, for pushing said part of the bead out on the side and over the tread of its portion of the core while the opposite part of the casing remains in position on the core until the part which is being pushed over is clear.

6. In a machine for stripping tire casings from cores, the combination of a core holder, a tire core thereon, and stripping devices positioned at a plurality of points in fixed relation to its circumference, and adapted to act against the base of the tire bead while said bead is substantially held against the side of the core during its outward traverse thereon, for pushing said bead outwardly and over the tread of the core.

7. In a machine for stripping tire casings from cores, the combination of a core holder, a tire stripping machine having a relatively short projection for insertion under the toe of a tire bead and an adjacent shoulder for engaging the base of the bead, and means for operating said member to push said bead outwardly on the core without substantially lifting the bead away from the core.

8. In a machine for stripping tire casings from cores, the combination of a core holder, a tire stripping finger mounted in a circumferentially fixed relation to the core, a lever fulcrumed in the rear of said core holder and pivotally connected with said finger, and means for swinging said lever to carry the finger radially outward and force the tire bead outwardly and then forward over the core.

9. In a machine for stripping tire casings from cores, the combination of a core holder, a tire core mounted thereon, a tire stripping finger adapted to act against the base of the tire bead to push said bead outwardly on the side and over the tread of the core, and means for guiding a point on said finger remote from its acting end in a path substantially parallel with the side contour of the core.

10. In a machine for stripping tire casings from cores, the combination of a core holder, a finger actuator, a tire stripping finger pivotally connected with said actuator, and means for guiding the pivot of said finger in a path substantially reproducing the side profile of a tire core having the shape of the inside of the finished tire.

11. In a machine for stripping tire casings from cores, the combination of a core holder, a finger actuating lever fulcrumed in the rear of said holder, a tire stripping finger pivotally connected with said lever, and a fixedly mounted guide for the pivot of said finger.

12. In a machine for stripping tire casings from cores, the combination of a core holder, a finger actuating lever fulcrumed in the rear thereof, a tire stripping finger pivotally and slidingly connected with said lever, and means for guiding the pivotal point of said finger in a path substantially imitating the side contour of a normal tire core.

13. In a machine for stripping tire casings from cores, the combination of a core holder, a tire stripping finger having laterally projecting pivot studs, a pair of fixed plates between which said finger slides in a radial movement, said plates having cam slots for said studs, and means acting on said studs for moving the finger inwardly and outwardly between said plates.

14. In a machine for stripping tire casings from cores, the combination of a core holder, a pair of fixed guide members having a radial finger guiding space between them and formed with pivot guiding slots, a tire stripping finger mounted to travel between said members and having pivot studs occupying said slots, and a finger actuating lever fulcrumed in the rear of said holder and having a slotted forward end pivotally and slidingly engaging said studs.

15. In a machine for stripping tire casings from cores, the combination of a core holder, a tire core mounted thereon, a finger actuating lever fulcrumed in the rear of said holder, and a tire stripping finger pivotally connected with said lever and having its outer end guided on the core, said finger having a substantially right-angled relation to the lever when the latter is retracted and a substantially alined relation thereto when the lever is projected.

16. In a machine for stripping tire casings from cores, the combination of a core holder, a finger actuating lever fulcrumed in the rear of said holder, a tire stripping finger pivotally connected with the forward end of said lever and adapted to have its operating end supported by the core when moving outwardly thereon, and means to prevent said finger from falling forward in its retracted position when no core is present.

17. In a machine for stripping tire casings from cores, the combination of a core holder, a finger actuating lever pivotally connected therewith, a spring for yieldingly turning said finger on the lever toward the core, a guide for said finger, and a stop on said guide to limit the forward pivotal movement of the retracted finger when no core is present.

18. In a machine for stripping tire casings from cores, the combination of a core holder, a series of tire stripping members mounted in fixed angular relation thereto, and a cam for successively projecting said members.

19. In a machine for stripping tire casings from cores, the combination of a core holder, a series of tire stripping fingers, a series of levers pivotally connected with said fingers, and a cam acting on said levers for successively swinging them into finger projecting position.

20. In a machine for stripping tire casings from cores, the combination of a core holder, a semi-circular series of tire stripping fingers mounted in fixed angular relation to said core, a cam shaft, and a cam on said shaft having an approximately semi-circular portion concentric with said shaft and a volute portion adapted successively to project said fingers in one revolution of the cam.

21. In a machine for stripping tire casings from cores, the combination of a core holder, a semi-circular series of finger actuating levers fulcrumed in the rear thereof, a series of core stripping fingers pivotally connected with said levers, and a cam acting on said levers and adapted in one revolution to swing said levers successively into finger projecting position.

22. In a machine for stripping tire casings from cores, the combination of a core holder, a tire stripping finger, a finger actuator, a cam for operating said actuator, an automatically locking device to hold said actuator in its finger projecting position, and means for retracting said locking device.

23. In a machine for stripping tire casings from cores, the combination of a core holder, a series of tire stripping fingers mounted in fixed angular relation thereto, a series of finger actuating levers, a series of lever locking devices yieldingly actuated in a direction to hold said levers in their finger projecting positions, a cam adapted successively to swing said levers into said positions, and means for simultaneously retracting said locking devices.

24. In a machine for stripping tire casings from cores, the combination of a core holder, a cam shaft substantially concentric therewith, a cam on said shaft, a series of finger actuating levers semi-circularly grouped about said shaft and adapted to be successively projected by the cam, tire stripping fingers operated by said levers, a sleeve axially slidable on said shaft, a series of lever-locking members on said sleeve having springs urging them axially thereon into lever-locking position, and means for sliding said sleeve along the shaft to simultaneously retract said devices.

25. In a machine for stripping tire casings from cores, the combination of a core holder, a series of tire stripping members mounted in fixed relation thereto circumferentially of the core, a cam adapted in one revolution successively to project said members, and a reciprocating fluid actuated device adapted in one out stroke and one in stroke to impart one revolution to said cam.

26. In a machine for stripping tire casings from cores, the combination of a core-holding chuck, a tire stripping member and means for actuating said tire stripping member, and means actuated by the aforesaid means for automatically actuating said chuck in predetermined relation to the action of said tire stripping member.

27. In a machine for stripping tire casings from cores, the combination of a core-holding chuck, a tire stripping member, a fluid pressure cylinder and piston, and connections whereby the movement of said piston first operates said chuck to grip the core and then operates said tire stripping member.

28. In a machine for stripping tire casings from cores, the combination of a core holding chuck, a series of tire stripping fingers, a cam adapted successively to project said fingers, a fluid pressure cylinder and piston, and connections whereby said piston on its out-stroke and in-stroke turns the cam through one revolution and at the beginning of its out-stroke operates said chuck to grip the core.

29. In a machine for stripping tire casings from cores, the combination of a core-holding chuck, a series of tire stripping members, means for operating said chuck to grip the tire and for operating said tire stripping members to project and retract the same, a controlling device for setting said operating means in action, and a connection between said operating means and controlling device whereby the machine automatically completes one cycle of operation and then stops when the controlling device has been set in its initial starting position.

30. In a machine for stripping tire casings from cores, the combination of a core holder, a series of tire stripping members, operating means for projecting and retracting said members, a controller for said operating means, and a connection between said operating means and controller whereby the tire stripping members are caused automatically to complete and stop at the end of one cycle of operation when the controller is set in its starting position.

31. In a machine for stripping tire casings from cores, the combination of a core holder, a series of tire stripping members, means adapted successively to project said members, locking means for holding them projected, lock retracting means, means common to the tire stripping members, the locking means and the lock retracting means for operating the same, a controller for said operating means, and connections between said controller and operating means whereby the machine completes one cycle of operations and then stops when the controller is set in its starting position.

32. In a machine for stripping tire casings from cores, the combination of a core holder, tire stripping devices, a fluid pressure cylinder and piston for operating said devices, and a controlling valve for said cylinder actuated by the traverse of the piston.

33. In a machine for stripping tire casings from cores, the combination of a core holding chuck, a series of tire stripping members, a double acting fluid pressure cylinder and piston adapted to operate said chuck to grip the core and then project and retract said members, a valve for controlling the admission and exhaust of both ends of said cylinder and adapted to be manually placed in a starting position, and valve tripping means actuated by the traverse of the piston for reversing said valve at the end of the out-stroke of the piston and moving it to neutral position at the end of the in-stroke.

34. In a machine for stripping tire casings from cores, the combination of a core holder, a series of tire stripping members, a cam adapted successively to project said members, a cam shaft, a fluid pressure cylinder and piston, and a pair of alternately-acting rack and pinion devices and associated one-way clutches for imparting one revolution to said cam shaft during an out-stroke and an in-stroke of the piston.

35. In a machine for stripping tire casings from cores, the combination of a core holder, a series of tire stripping members, a cam for successively projecting said members, locking devices for holding them projected, a retractor for said locking devices, retracting connections including a push rod and a one-way latch thereon, a fluid pressure cylinder and piston having connections for imparting one revolution to said cam during an out-stroke and an in-stroke of the piston, and cam means connected with said piston and adapted on the out-stroke thereof to displace said latch and on the in-stroke to operate the push rod and thereby retract the locking devices.

36. In a machine for stripping tire casings from cores, the combination of a core holding chuck, a shaft concentric therewith and having a cam, a series of tire stripping members adapted to be successively projected in one revolution of said cam, a lock retracting sleeve movable axially of said shaft and having a series of locking devices adapted to hold said members projected, a double-acting fluid pressure cylinder and piston, connections from said piston to the shaft for turning the latter through one revolution on an out-stroke and an in-stroke of the piston, means connected with said piston for actuating said chuck to grip the core on the out-stroke of the piston and for actuating said retracting sleeve on the in-stroke thereof, a valve controlling admission and exhaust of both ends of said cylinder and adapted to be manually placed in its starting position, and valve tripping devices connected with said piston for reversing the valve at the end of the out-stroke of the piston and for restoring it to neutral position at the end of the in-stroke.

In witness whereof I have hereunto set my hand this 6 day of January, 1922.

CURT KUENTZEL.